E. THOMSON.
PROCESS OF MAKING NITRIC ACID.
APPLICATION FILED DEC. 6, 1918.

1,337,106.

Patented Apr. 13, 1920.
2 SHEETS—SHEET 1.

Inventor,
Elihu Thomson
by Albert H Davis
His Attorney.

E. THOMSON.
PROCESS OF MAKING NITRIC ACID.
APPLICATION FILED DEC. 6, 1918.

1,337,106.

Patented Apr. 13, 1920.
2 SHEETS—SHEET 2.

Inventor,
Elihu Thomson,
by
His Attorney.

UNITED STATES PATENT OFFICE.

ELIHU THOMSON, OF LYNN, MASSACHUSETTS, ASSIGNOR TO GENERAL ELECTRIC COMPANY, A CORPORATION OF NEW YORK.

PROCESS OF MAKING NITRIC ACID.

1,337,106.  Specification of Letters Patent.  Patented Apr. 13, 1920.

Application filed December 6, 1918. Serial No. 265,631.

*To all whom it may concern:*

Be it known that I, ELIHU THOMSON, a citizen of the United States, residing at Lynn, in the county of Essex, State of Massachusetts, have invented certain new and useful Improvements in Processes of Making Nitric Acid, of which the following is a specification.

The present invention comprises an improved process of making nitric acid.

Processes heretofore employed for converting nitric oxid into nitric acid have involved the use of large and expensive absorbing towers. It is the object of my invention to provide an improved apparatus of less cost in which the absorption and conversion of oxids of nitrogen to nitric acid may be carried out. My invention includes both a process and an apparatus for utilizing the solubility at low temperature of the nitric oxids in nitric acid as a step in the production of nitric acid.

Figure 1:
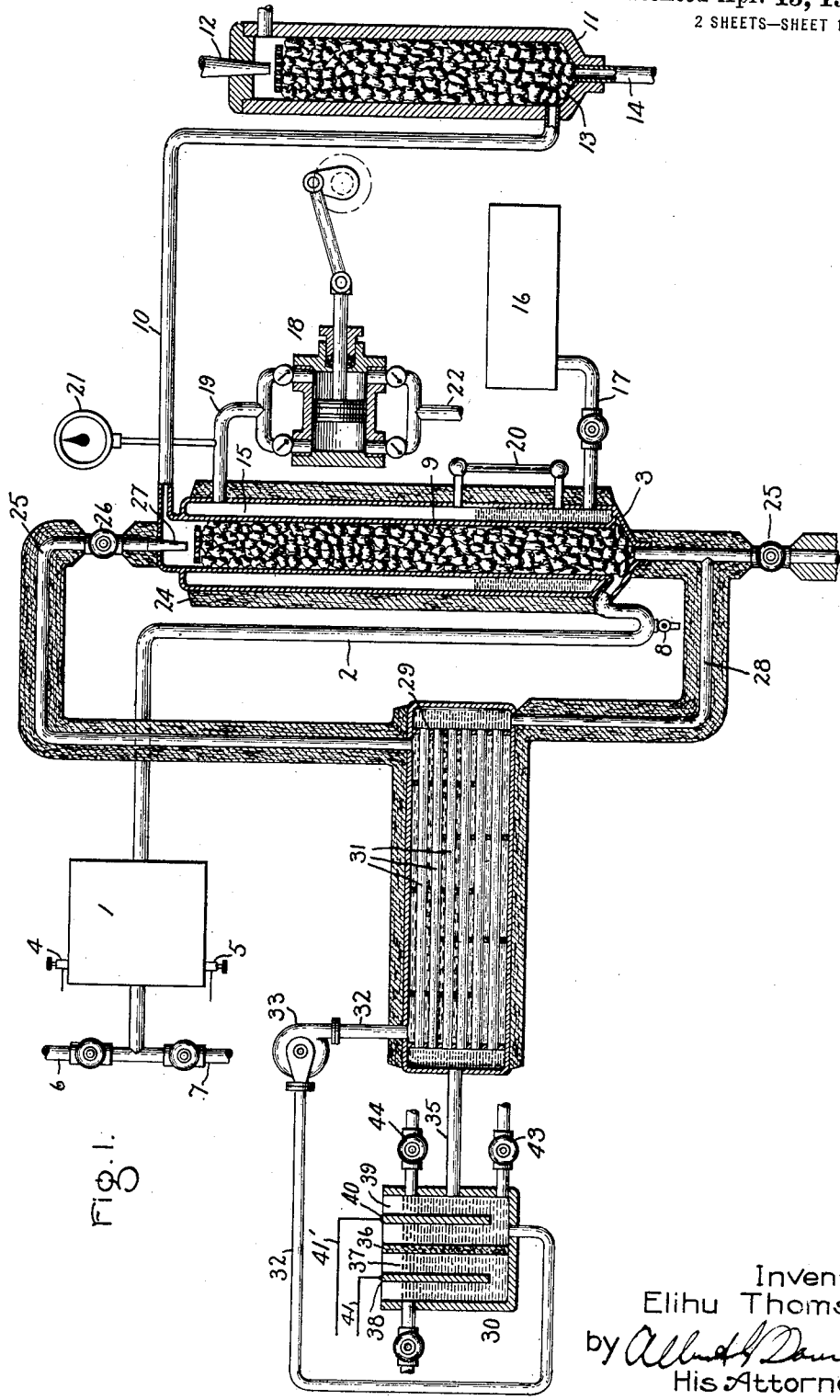
Figure 2:
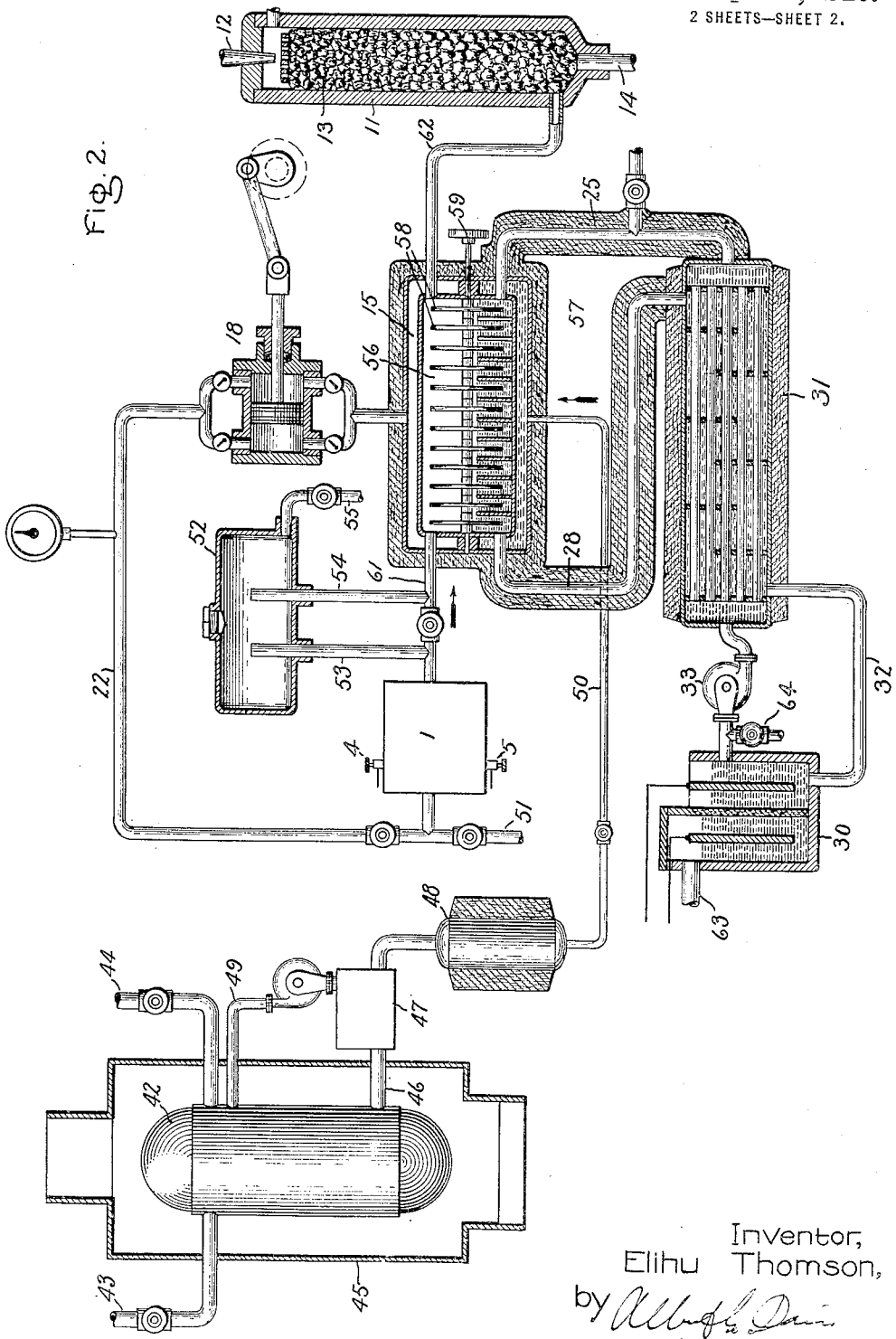

In the accompanying drawings, Figure 1 illustrates somewhat diagrammatically a sectional view of one form of apparatus suitable for carrying out my invention; and Fig. 2 illustrates another form of apparatus having a somewhat modified absorbing device.

Referring to Fig. 1, nitric oxid or nitrogen peroxid made by any suitable process in a reaction chamber 1 is passed through a conduit 2 to the absorbing column 3. For the purpose of illustration I have shown the oxidizing chamber diagrammatically as a rectangle provided with electrical terminals 4, 5. The gases to be acted upon being supplied by pipes 6 and 7. The nitric oxid or peroxid may be produced as known, for example, by oxidizing ammonia in contact with a suitable catalyst such as heated platinum gauze in the chamber 1. The excess moisture condensed in the pipe 2 may be drained through a valve 8 at the bottom of the pipe 2. The walls of the absorbing column 3 and the filling therein consist of acid-resisting material 9, for example, earthenware or a suitable alloy. The filling which should be adapted to expose a large surface may consist of pieces of hard burned coke, pumice stone, or the like.

The gas is entered at the bottom of the absorbing column and passed upward to the top of this column and out through the pipe 10. The residual gas passing the absorbing column will be composed mostly of nitrogen and a small percentage of nitric acid vapor and nitric oxid or peroxid gas. In order to absorb this residual vapor a second absorbing column may be used, as indicated at 11. The column 11 may be a scrubber of the ordinary type in which a stream of water or other absorbing fluid introduced by a pipe 12 flows over a packing of granular material 13, such, for example, as coke. The absorbing liquid is drained by a pipe 14.

The absorbing column 3 is kept at a low temperature, for example, by the evaporation of liquid ammonia contained in the chamber 15 between the double walls of the column. The evaporation of this liquid ammonia which may be received from a reservoir 16 through a valve-controlled conduit 17 is accelerated by means of a pump 18 connected with the chamber 15 by a conduit 19. The height of the evaporating liquid is indicated by a gage 20 and the pressure of the gas above the liquid by a gage 21. The gaseous ammonia drawn from the evaporating chamber by the pump 18 may be delivered by a pipe 22 to the catalyzing chamber 1 by suitable piping not shown in the drawing. The exposed parts of the absorbing column are jacketed by a layer of heat-insulating material 24.

By evaporation of the liquid ammonia the temperature within the absorber may be maintained at a low temperature, say, 40 degrees below zero C., or thereabout. As the gas from the pipe 2 passes up through the absorbing column it is met by a stream of nitric acid which may be from 60 to 70% strength delivered by a conduit 25 containing a controlling valve 26, and terminating in a nozzle 27 at the top of the absorbing column. The nitrogen oxids are dissolved by cooled nitric acid with great readiness. Care should be exercised not to carry the degree of cooling low enough to cause solidification. The solution consisting of nitric acid and dissolved gases and vapors passes out through the heat-insulated conduit 28 through a heat interchanger 29 to an electrolyzing cell 30. In its passage through the heat interchanger the highly cooled acid solution takes up heat through the walls of the tubes 31 from the stream of acid drawn from the electrolyzing cell 30 through a tube 32 by a pump 33 and delivered to the absorbing column.

In the electrolyzing cell the nitric acid solution is warmed by the passage of the electric current and the heat interchanger therefore effects an economical operation of the apparatus by abstracting some of the undesired heat from the acid flowing from the electrolyzing cell to the absorber where the acid is still further cooled by evaporation of the liquid ammonia in the chamber 15. The acid solution containing dissolved nitric oxid flowing from the absorber to the cell 30 is warmed in like degree by its passage through the heat interchanger. It is delivered to the electrolyzing cell through a pipe 35.

The electrolyzing cell is divided into two compartments by partition 36 consisting of unglazed porcelain or other suitable porous material, a compartment 37 may contain either a solution of dilute sulfuric acid or other suitable electrolytes in which is immersed the cathode 38 consisting of carbon, or other suitable material. In the chamber 39 is contained the nitric acid solution in which is immersed an anode 40 consisting of platinum, gold or alloys resistant to oxidation. By the passage of a direct current delivered by conductors 41, 41', nascent oxygen is produced at the anode 40 which goes into combination with nitrous acid and nitric oxids dissolved in the nitric acid and converts the same into nitric acid so that the concentration of the acid contained within chamber 39 is increased. A certain part of the acid solution is periodically or continuously drawn off through a valve-controlled pipe 43 and water is introduced through the pipe 44 so that the result is a production of nitric acid. The gases given out at the cathode 38 are largely hydrogen, which may be utilized in any desired way; for example, for the production of ammonia by combination with nitrogen.

In the modified system illustrated in Fig. 2, an alternate absorption apparatus has been embodied, the system otherwise being analogous to that already described in connection with Fig. 1. In this system an apparatus 42 containing suitable catalysts for producing ammonia is provided, as now known in the art. Nitrogen and hydrogen in right proportions are introduced by pipes 43 and 44 and a sufficiently elevated temperature is obtained by inclosing the catalyzing vessel 42 in a suitable furnace diagrammatically represented by the inclosure 45. The temperature may be maintained after starting by the heat of the reaction itself.

The reaction products from the catalyzer 42 pass into a conduit 46 where they are suitably cooled, as diagrammatically indicated, by a condenser 47. The liquid ammonia collects in a heat-insulated receptacle 48 and the gaseous residue is returned to the catalyzer 42 by the pipe 49. The apparatus illustrated is shown symbolical of known forms of ammonia-producing catalyzers, the pressure in which is sufficient to liquefy the product when gases are cool.

The liquid ammonia is conveyed from the chamber 48 through pipe 50 to an evaporating chamber 15, similar to that already described in connection with Fig. 1. The evaporation of the liquid ammonia is assisted by a suction pump 18 in order that low temperatures may be obtained and the evaporated ammonia is passed by the conduit 22 to a suitable catalyzing reaction chamber 1 where it is oxidized, for example, by air received through a pipe 51. Nitric oxid and water are produced by the oxidation of the ammonia, and as the water content may be more than is desired in the absorption apparatus, the gas stream may be shunted when necessary into a condenser 52 through pipes 53, 54. The removal of condensed moisture from the condenser 52 is effected by a drain 55. It is desirable that the gases shall not be entirely free from moisture but carry a certain amount of water with them into the absorption chamber 56.

In this absorption chamber there is a body of nitric acid contained in a number of separate cells 57 which communicate by the flowing of liquid over the partitions between the cells from one cell to the next. Dipping into the liquid in the cells 57 are a number of disks 58 mounted upon a shaft 59 which may be kept into revolution by suitable mechanism, not shown in the drawing. The disks 58 preferably consist of porous material not affected by acid, such, for instance, as well baked unglazed earthenware. The revolution of the disks carries with it a film of acid which by being exposed to the stream of nitric oxid gas at a low temperature, say 40 degrees below 0° C. or thereabout, absorbs or dissolves the nitric oxid gases which enter through the pipe 61 and leave the absorption chamber by pipe 62. The unabsorbed nitric oxid in the gas leaving by the pipe 62 is absorbed by a second absorption vessel 11 similar to that already described in connection with Fig. 1. The nitrogen escaping by pipe 14 may be used when sufficiently purified in the catalyzer 42 to produce ammonia by interaction with hydrogen.

The nitric acid is conveyed by pump 33 from the electrolyzing cell 30 by the pipe 32, the heat interchanger 31 and the conduit 25 through the absorber in a direction opposite to the flow of the nitric oxid gases from the oxidation chamber 1 so that there is a gradual increase of concentration of dissolved gases by the counter current principle as the acid passes through the absorber. The acid solution of nitric oxid leaves the absorber by conduit 28 and flows through the heat interchanger 31 to the electrolytic cell 30. In the electrolytic cell the nitrous acid formed by the nitric oxid in contact with water is converted into nitric acid by the nascent oxygen. The excess of nitric acid is tapped off from the electrolytic cell by a conduit 64. The hydrogen escaping from the cathode compartment of the cell by the pipe 63 may be utilized in the synthetic ammonia apparatus.

It will thus be seen that the system is capable of furnishing for itself both hydrogen and nitrogen and that the product of this operation is a continual addition to the stock of nitric acid content in the apparatus, the excess representing the desired end product.

What I claim as new and desire to secure by Letters Patent of the United States, is:—

1. In a process of producing nitric acid, the step which consists in dissolving oxid of nitrogen in nitric acid at a temperature of about 40° below zero centigrade.

2. The process of producing nitric acid from nitric oxid which consists in absorbing said oxid by nitric acid at a low temperature, converting the gases in solution to nitric acid, returning part of said acid to said low temperature absorption zone within thermal relation to the acid solution flowing from said absorption zone thereby cooling the solvent acid flowing to said zone and warming the acid solution flowing from said zone.

3. The process of producing nitric acid which consists in bringing oxid of nitrogen gas into contact with a solvent, cooling said solvent and gas by the evaporation of liquid ammonia, and oxidizing the gaseous ammonia resulting from said evaporation.

4. The process of producing nitric acid which consists in bringing nitric oxid into contact with nitric acid in an absorption zone, cooling said zone by the evaporation of liquid ammonia, conducting away the acid solution and nitrogen residue separately, oxidizing the gaseous ammonia resulting from said evaporation with air to form nitric oxid, electrolyzing the nitric acid solution of nitric oxid to convert said oxid to nitric acid and liberating hydrogen and utilizing the liberated hydrogen and the nitrogen residue from said absorption zone to produce additional quantities of ammonia.

5. An apparatus for producing nitric acid comprising an absorption chamber, means for furnishing said chamber with nitric oxid, means for cooling said absorption chamber, an electrolytic cell, a conveying system for circulating a liquid between said cell and said absorption chamber, and means for conveying away a portion of the liquid from said cell.

6. An apparatus for producing nitric acid comprising an absorption chamber, means for spreading a liquid in said chamber into thin layers, means for cooling said chamber, an electrolytic cell having an anode and a cathode compartment, a conveying system for circulating an absorbing liquid between the absorption chamber and the anode compartment of said cell, and means for introducing nitric oxid in contact with the cooled films of absorbing liquid in said absorption chamber.

7. In an apparatus for producing nitric acid from nitric oxid, an electrolytic cell comprising the combination of a container, a partition of porous material dividing said container into compartments, and electrodes located in said respective compartments.

8. In an apparatus for producing nitric acid from oxidized nitrogen, an electrolytic cell comprising in combination a container, a partition dividing said container into compartments, a cathode located in one compartment, an anode located in another compartment, a source of direct current connected to said electrodes, means for furnishing a solution of oxidized nitrogen to said anode chamber, and means for removing a portion of the contents from said cell.

9. An apparatus for producing nitric acid comprising the combination of an absorption chamber, means for cooling said chamber by the evaporation of liquefied ammonia, means for oxidizing the gaseous ammonia resulting from said evaporation, a conduit for conveying the product of said oxidation to said absorption chamber, and means for supplying to said chamber an absorbing menstruum for said products.

10. An apparatus for producing nitric acid comprising the combination of an absorption chamber, means for externally cooling said chamber, and means for furnishing nitrogen oxid to said chamber.

11. In an apparatus for producing nitric acid, the combination of means for furnishing oxidized nitrogen, an absorption chamber, means for cooling said chamber, an electrolytic cell, conduits connecting the cooling chamber and said cell for circulating an absorbing liquid to and from said chamber and cell, and a heat interchanger between said conduits.

12. The cyclic process of producing nitric acid which consists in absorbing oxid of nitrogen by dilute nitric acid at a low temperature electrolyzing the resulting solution to convert said oxid to nitric acid, thereby enriching said acid, removing a portion of said acid, cooling the residue and adding water and oxid of nitrogen to complete the cycle.

13. The process of producing nitric acid which consists in subjecting a solution of oxid of nitrogen to electrolytic action at an anode and confined out of contact with a cathode, thereby enriching said solution in nitric acid, removing a portion of said acid and replacing the same by water and oxid of nitrogen, said process being cyclically repeated to continuously yield nitric acid.

14. The process of increasing the concentration of dilute nitric acid which consists in dissolving nitric oxid therein, subjecting said solution to electrolysis in contact with the anode of an electrolytic cell and maintaining said solution out of contact with the cathode by a diaphragm substantially impermeable to said solution but conductive to electric current.

In witness whereof, I have hereunto set my hand this 2nd day of December, 1918.

ELIHU THOMSON.